Figure 1:
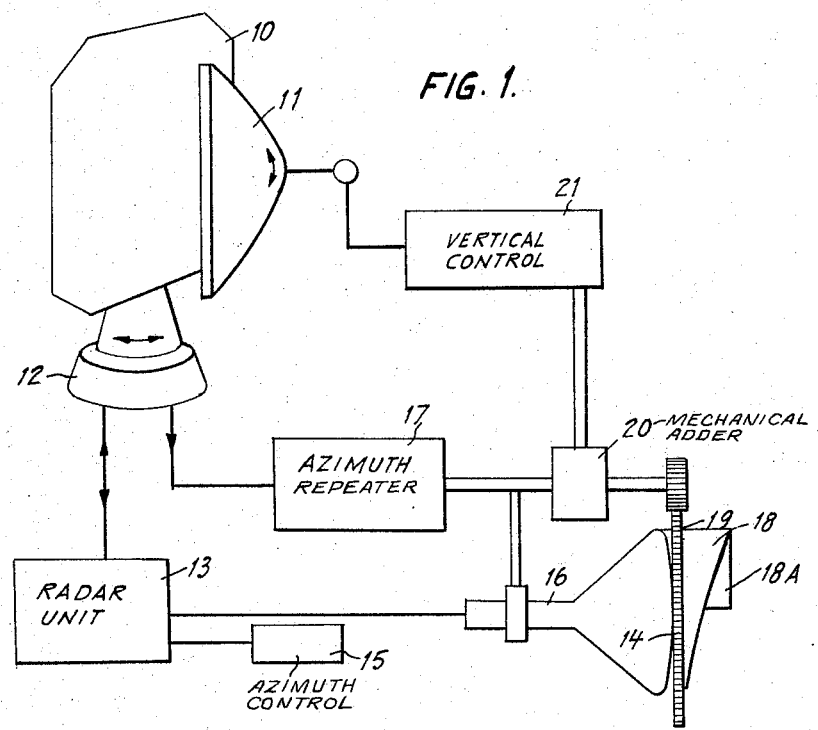

Jan. 24, 1967 R. SIRKIS 3,300,779
THREE DIMENSIONAL PICTORIAL DISPLAYS
Filed March 15, 1963 2 Sheets-Sheet 1

INVENTOR.
RAFAEL SIRKIS
BY Bierman & Bierman
ATTORNEYS

Jan. 24, 1967 R. SIRKIS 3,300,779
THREE DIMENSIONAL PICTORIAL DISPLAYS
Filed March 15, 1963 2 Sheets-Sheet 2
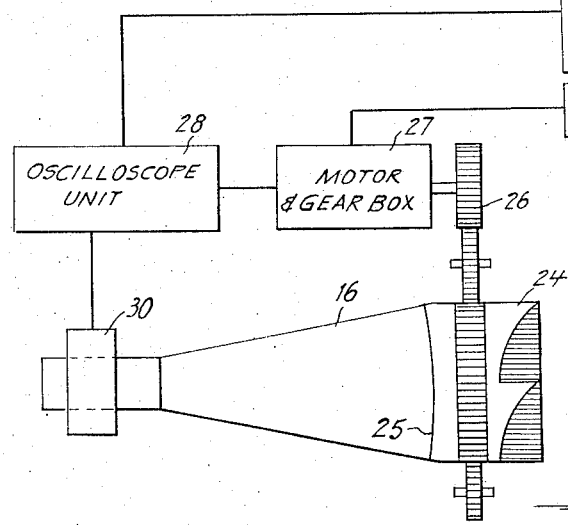
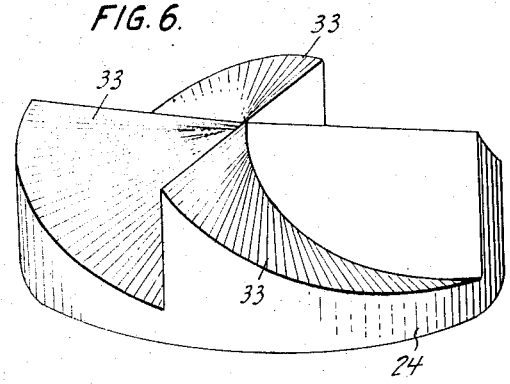
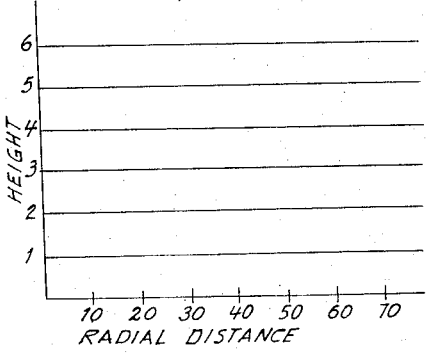
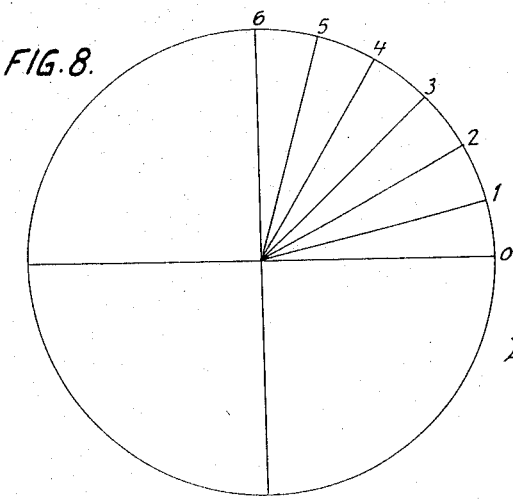
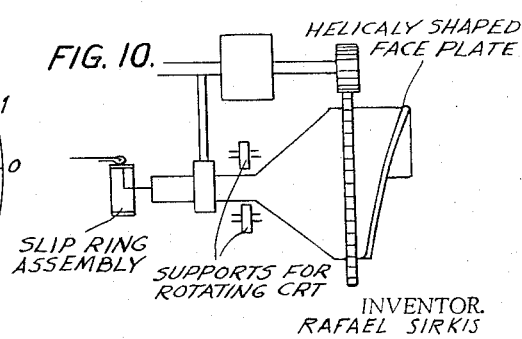
INVENTOR.
RAFAEL SIRKIS
BY
ATTORNEYS

United States Patent Office 3,300,779
Patented Jan. 24, 1967

3,300,779
THREE DIMENSIONAL PICTORIAL DISPLAYS
Rafael Sirkis, Haifa, Israel, assignor of fifty percent to Technion Research and Development Foundation, Ltd., Haifa, Israel, a corporation of Israel
Filed Mar. 15, 1963, Ser. No. 265,451
Claims priority, application Israel, June 18, 1962, 17,497
13 Claims. (Cl. 343—7.9)

This invention relates to a 3-dimensional pictorial display and particularly but not exclusively to a cathode ray tube display. A 3-dimensional cathode ray tube display is capable of presenting information in a volume of space. This information appears in the form of spots of light in this volume, each spot having a distinct spatial position which is a function of the three presented variables. The brilliance of each of the infinite number of spots which fill the volume of space is a function of the three presented variables and of time. Normal 2-dimensional cathode ray tube displays are limited to displaying the variation of the intensity and position of a spot of light with respect to only two variables. Where it is required to introduce the variation with respect to a third variable, the usual procedure is to employ two cathode ray tube displays with a consequent necessity of collecting and correlating the information provided by each display separately.

Thus, for example, where cathode ray tubes are included in a radar set and are designed to provide data concerning the position of an object in space, the absolute determination of this position requires knowledge of the range, height and azimuthal angle of that object with respect to the position of measurement. A P.P.I. scope is usually employed to obtain information concerning the range and azimuthal angle of a detectable object. In order to obtain information concerning the height of an object, a separate cathode ray tube display (such as an R.H.I. Scope) is required. The use of such two display units (generally by two operators) has the disadvantage that it is difficult to obtain complete coordination of the information provided by these units.

It has been proposed to overcome this difficulty in connection with radar by providing a 3-dimensional cathode ray tube display in which complete 3-coordinate information is made available. In accordance with this proposal the deflection of the spot along two of the spatial coordinates is effected electronically whilst the apparent deflection of the spot along the third spatial coordinate is effected mechanically. For this purpose it has been suggested to project the display produced on the screen of a cathode ray tube onto a movable screen or mirror which is then provided with a reciprocal drive to and from the cathode ray tube screen at a rate which is a function of the scanning frequency of the radar antenna in that particular coordinate.

Such previous proposals have, however, not proved to be successful and their failure may particularly be attributed to the considerable mechanical difficulties involved in reciprocating a screen at a very high frequency and also to the inherent distortion in the display produced on such a screen.

It is an object of the present invention to provide a new and improved arrangement for producing a 3-dimensional pictorial display which constitutes an improvement over the hitherto proposed arrangements both from the mechanical point of view and from the point of view of fidelity of presentation.

According to the present invention there is provided an arrangement for producing a 3-dimensional pictorial display comprising a display member having one or more helical surfaces formed about a common axis and constituting or being disposed adjacent or opposite a source picture, means for ensuring that the picture is effectively produced or reproduced on the surface or surfaces, and means for rotating the member about the axis at a speed which is a function of one or more of the three variables of the display.

As used in the present specification the term helical surface includes a plurality of elementary surfaces having a substantially helical envelope.

The helical surface, in being rotated about the axis about which it is formed defines a volume of space which is continually being scanned by the surface. Thus, if one considers an imaginary line extending through the helical surface and parallel to the axis, this line will be continuously cut along its length by the surface upon rotation of the latter. In other words, the line is continuously scanned by the surface. Similarly, all the other parallel lines which are at the same radial distance from the axis of rotation as the first mentioned imaginary line, are scanned with a time delay which is proportional to the central angle between them. In the same way the volume of space scanned by the surface can be considered as being constituted by an infinite number of such parallel lines. The rate at which this volume of space is scanned depends directly on the form of the surface and on its speed of rotation. Thus each line in this volume can be completely scanned one or more times for each complete rotation of the surface.

Now in order to render the present invention practicable, it is essential that the display produced in the volume of space scanned by the surface be readily visible to a viewer and for this purpose advantage is taken of the phenomenon of persistence of vision by virtue of which an observer is unable to distinguish between visual occurrences which take place at a frequency higher than about twenty times per second. When visual occurrences take place at a frequency which is at least equal to this value then the occurrence appears to be static. This phenomena is of course the basis upon which cinematographic projection is possible. In the present case in order to utilize such persistence of vision it is necessary to ensure that each of the above referred to imaginary lines is scanned at a frequency which is at least equal to this minimum value by the rotating surface. In this way by producing at distinct points in the 3-dimensional display volume scanned by the surface, bright flashes of light at a rate at least equal to twenty occurrences per second, these bright points in the display volume appear as static points and the observer can detect and estimate the actual spatial position of the points without the need for any special viewing aids.

By carefully synchronizing the variation of the 2-dimensional picture source it can be arranged that each light flash originating from a source picture appears only when the appropriate portion of the helical surface is aligned or otherwise suitably coordinated therewith and does not appear at other times.

Preferably the picture source is constituted by the face of a cathode ray tube in which case the display member either constitutes this face or is disposed closely adjacent or opposite the face of the tube. In order to fulfill the requirement that each discrete flash of light in the source picture should appear only at the time that the source is suitably coordinated with the correct portion of the display surface, it must be arranged that the screen of the cathode ray tube should have substantially no persistence characteristics.

In accordance with an alternative embodiment of the invention the picture source can be constituted by a film strip in which the successive frames show successive sections in depth of the object to be viewed. In this embodiment the display member is disposed adjacent or opposite the film and it is ensured, by conventional methods of film projection that each frame is correctly reproduced on the helical surface of the display member which is rotated at a speed which is a function of the rate of displacement of the strip opposite the member. With such an arrangement it is possible to view, on the display member, a representation in depth of the object.

In the event where the display produced is a radar display the arrangement in accordance with the invention can be employed to provide simultaneous information concerning the range, height, and azimuthal angle of an object being tracked. Thus, where the display unit forms part of a radar set equipped with vertical scanning the rotation of the display member is synchronized with the vertical scanning and as a result the display provides simultaneous information concerning the exact position of an object.

Alternatively, the arrangement in accordance with the invention when used for producing a 3-dimensional cathode ray tube display can employ the depth or "z" parameter provided by the rate of rotation of the display member as the time base of the display, thereby leaving free the "x" and "y" deflections of the spot for displaying other variables.

According to a preferred embodiment of the present invention, the display member is constituted by a bundle of thin optical glass fibres, the member as a whole displaying the characteristic fibre optic properties. By virtue of these fibre optic properties of the display member a picture, when disposed very close to or projected on to one face of the member, is effectively reproduced on the opposite face. In the case of the display member, in accordance with the invention, this opposite face is constituted by the helical surface or surfaces.

The display member can be arranged to constitute the face of the cathode ray tube in which case means must be provided for rotating the tube as a whole about a longitudinal axis, which axis coincides with the common axis of the helical surfaces. Where the display member thus constitutes the face of the cathode ray tube, the face can be formed of the bundle of optical glass fibres referred to above in which case the inner surface of the face is shaped for optimum focusing and is coated with a fluorescent material so as to serve as a source picture. Alternatively, however, the face can be constituted of ordinary glass which has been shaped both internally and externally to constitute the helical surface(s). In the latter case, however, special attention has to be provided so as to overcome the focusing problems.

The display member can be disposed adjacent to the face of the cathode ray tube, in which case the means referred to ensures rotation of the display member alone. Where the display member, as a separate body, is formed of a bundle of optical glass fibers, the shaping of the inner surface of the display member will depend on the type of source picture employed. Where the source picture is provided by a cathode ray tube, the tube itself can be formed with a fibre optic front face and the display member can be placed in contact with this front face. Alternatively, a lens projection system can be used to project the cathode ray tube picture from the screen thereof on to the inner surface of the display member. As a further alternative, the display member can be formed of a semi-opaque material, means being provided for projecting the picture source onto the display member, the display being viewed from the side of the display member remote from the picture source. As a still further alternative, the display member can be constituted by a mirror surface or by an opaque screen disposed opposite the picture source and caused to rotate. In the case of the latter alternative, the display is viewed from the side of the display member adjacent the picture source.

Figure 2:
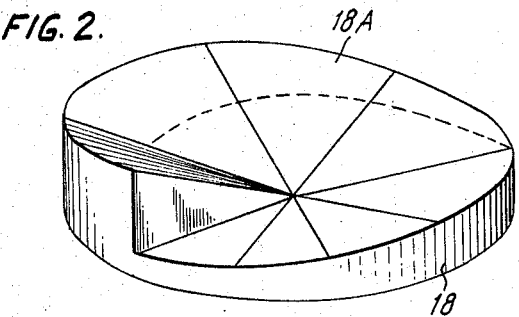
Figure 3:
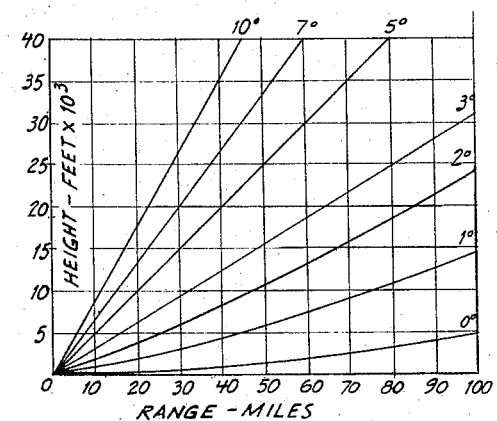
Figure 4:
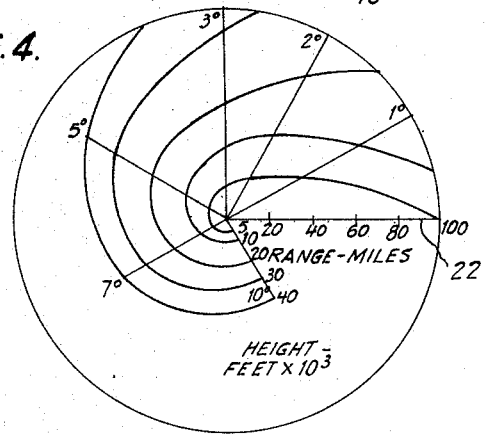

The invention will now be described by way of example and with reference to the accompanying drawings in which:

FIG. 1 is a schematic block diagram of a radar set having vertical scanning and provided with a 3-dimensional pictorial display arrangement in accordance with the invention, FIG. 2 is a perspective view of the display member used in the display arrangement as shown in FIG. 1, FIG. 3 is a series of curves, each curve showing the variation for a given angle of elevation of the height of an object as a function of its range, these curves also constituting radial sections of the display member shown in FIG. 1, FIG. 4 is a plan view of the display member shown in FIG. 1, FIG. 5 is a schematic block diagram of a 3-dimensional oscilloscope utilizing a 3-dimensional display member to serve as a time base in accordance with the invention, FIG. 6 is a perspective view of the display member used in the display arrangement shown in FIG. 5, FIG. 7 is a series of lines showing the variation in height along some of the radii of the display member shown in FIG. 6, FIG. 8 is a plan view of the display member shown in FIG. 5 showing its radial contour lines for one of its quarters, FIG. 9 is a side view of a display member using a fibre optical face plate, and FIG. 10 is a side view of a display member using a helically shaped face plate.

The radar set to which the present invention is applied in the example now to be described is a simple 3-dimensional radar set scanning and displaying that portion of the hemisphere of space about it having a maximum range of about 100 miles, a maximum height of about 40,000 ft. and a scanned vertical angle of range between 0 and 10°. The vertical scanning is effected continuously at a rate of twenty times per second. The scanning is effected linearly with respect to time and it will be readily appreciated that there exists a time delay between the maximum angle of scanning and the resetting to the starting position. In the example now being considered the ratio between the effective time of scanning and the time of resetting is 5:1.

The horizontal scanning can be effected as a result of continuous rotation of the antenna at a rate of say 4 revolutions per minute. Alternatively or additionally the horizontal scanning can be controlled manually and can also be subjected to sector scanning.

The display unit employed in the radar set being considered constitutes, before the various modifications required to render it suitable for use in the present invention, the display unit of a standard P.P.I. type. The screen of the oscilloscope employed must, however, not possess any substantial persistence. The deflection coils used for creating the radial sweep on the screen are moved mechanically by an azimuth repeater servo-mechanism. The standard unit is also usually provided with a form of height indicator which can of course be omitted in the present instance. However some of the electronic circuits of this indicator will be retained for height marking.

As seen in FIG. 1 of the drawings a radar antenna 10 is rotated about a vertical axis by an azimuthal drive mechanism 12. The rays emitted from the antenna 10 are caused to scan automatically and continuously in the vertical direction by a vertical scanning mechanism 11. A radar set unit 13 comprising a transmitter, receiver, sweep generator etc. is coupled on the one hand with the antenna 10 and on the other hand with an azimuthal control mechanism 15. The received signal is fed from the transmitter receiver unit to the grid or cathode of the cathode ray tube 16 of which the screen 14 has substantially no persistence. The end portion of the tube, on which the screen is deposited, is made up of a vacuum-sealed bundle of optical fibers which insures the effective transmission of light patterns from the screen to the display member 18. The position of the radial time base of the tube 16 is synchronized with the scanning of the antenna 10 via an azimuthal servo-control mechanism 17.

A display member 18 formed of a bundle of optical glass fibre material to be described in detail below is disposed adjoining the face 14 of the cathode ray tube 16 and is arranged to be rotated about the longitudinal axis of the tube by a geared rack mechanism 19, driven by a synchronizing mechanism 20 which is a mechanical adder. This mechanism 20 adds two speeds of rotation, one of which corresponds to the vertical scanning of the feeder 11 and the other of which corresponds to the horizontal scanning of the whole antenna 10.

In operation, as a result of the azimuthal scanning by the radar antenna, a radial line of light rotates about the longitudinal axis or scans only a sector, or points to a manually controlled direction on the screen of the cathode ray tube. This radial line of light is in fact the sweep of the display unit and the detection of an object in space results in the appearance of a particularly bright spot along this line, the position of this spot corresponding to the range and azimuthal angle of this object in respect to the position of the radar set. As a result of the particular optical properties of the display member and the cathode ray tube front face discussed above, this rotating line of light is visible on the helical surface of the display member 18. At the same time, however, the radar antenna 10 scans vertically at a constant frequency. The rotation of the display member 18 is synchronized with the vertical scanning of the antenna by a control circuit 21. The display member 18 is rotated at a speed which is the sum of the slow horizontal scanning speed and the fast vertical scanning speed. In this way it is ensured that the inclination and curvature of that portion of the helical surface 18A which is at any instant above the radial sweep corresponds at that instant to the actual elevation angle of the emitted ray. As a result of the vertical scanning therefore and the rotation of the display member, the radial line of light referred to above appears as a triangular plane of light extending in the display member parallel to the longitudinal axis. Where reflections are received from any object in space, these reflections appear as bright spots on the display member, the location of each of these spots on the display member being precisely identifiable in terms of range, azimuthal angle and elevation in terms of its position in the plane of light referred to. There can thus also be displayed and directly detected, mountain tops, clouds, planes etc., and they can be readily distinguished from one another.

Referring now to FIG. 2 of the drawings, the display member 18 is provided with an upper surface 18A which spirals about a central axis. In addition to spiralling about this central axis, the upper surface is also radially curved. As explained above, by virtue of the spiralling of the upper surface about the central axis, it is ensured that rotation of the display member scans an identifiable volume of space, this scanning being effected continuously. When the display member 18 which is preferably constituted by a disc of fibre optic material is disposed against the face of a cathode ray tube, on the screeen 14 of which is reproduced a P.P.I. display and when the display member is caused to rotate at a rate which is synchronized with the rate of vertical and horizontal scanning of the radar antenna, the volume of real space being scanned by the radar antenna will be represented by the volume of space scanned by the display member 18 and the position of any object in space from which a radar reflection is detected will be identifiable on the display member as a bright spot in the scanned volume.

As can be seen directly from FIG. 2, the shape of the display member is a continuously rising helical surface which spirals about a central axis to a maximum height from where it descends abruptly to the start position. This instantaneous drop to the start position is not however essential, since as will be seen later in the description of the display member, a substantial sector of the display member, referred to as the "dead zone" is available for this drop. The shape of the helical surface is illustrated graphically in FIGS. 3 and 4 of the drawings. FIG. 3 shows how the height of the surface varies for each particular elevation or central angle with distance along the radius assuming the radar set to be located at sea level. As can be seen, none of these lines are straight but represent directly the concave curvature of the surface referred to above. The curves shown in FIG. 3 are calibrated directly in terms of height and range of scanning. The curvature of these lines and of the surface arises out of the fact that there has been taken into account the earth's curvature. This factor is conventionally taken into account in 2-dimensional range height indicators. As is also the case in conventional 2-dimensional range height indicators, the height dimension is not reproduced on the same scale as is the range dimension. This is done in order to utilize the scanned volume more effectively and to effect the height measurement more easily.

Referring to FIG. 4, there is shown a plan view of the display member on which can be seen some of the contour or equi-height lines, the height being indicated directly in thousands of feet. For this particular example 40,000 ft. has been taken as the maximum height which is displayed and therefore the 40,000 ft. line on the surface constitutes the boundary of the effective surface. The portion of the display member which corresponds to heights beyond 40,000 ft. does not play any effective part in the display and can therefore be made opaque, its constitution being unimportant in connection with the display. Similarly, that sector of the display member which is shown as having no contour lines on it is also ineffective in the display. This sector arises out of the so-called dead zone which is the time taken for the vertical scanning antenna to return from its maximum elevation angle to the starting position. During this time no useful information can be received. In this particular example a ratio of 5:1 has been taken as the ratio between the time of scanning and the time of return to the start position. This is also the ratio between the central angle of this sector and that of the rest of the display member. This sector in common with the other ineffective portion of the display member referred to above can be opaque and does not have to be constituted of the fibre optic material. The actual form of this sector and the other ineffective portion is not relevant to the actual display and in consequence its form can be decided on the basis of optimum dynamic balancing of the rotating body. Furthermore FIG. 4 shows directly a radial range scale 22 calibrated in miles and also radial lines indicating the angle of elevation of the antenna.

In practice some of the equi-height or contour lines can be marked on the surface and when these lines are illuminated and upon rotation of the display member the lines will be seen as parallel planes extending through the height of the display volume. Thus these planes can constitute calibration planes by means of which the height of an object can be estimated. In order, however, to give an accurate measurement of the height of an object a manually controlled electronic height marker can be employed. Similarly, electronic range markers can be provided. In the scanned volume these markers will appear as concentric cylinders of light each extending to a height corresponding to the maximum height which can be attained by the emitted radar ray for such a range. By means of such electronic range markers measurement of range becomes possible.

A further example of the use of a 3-dimensional display arrangement in accordance with the invention will now be described with reference to FIGS. 5, 6, 7 and 8 of the drawings. In this case the helical surfaces of the display member employed are used as a time base. As seen in FIG. 5 of the drawings an oscilloscope 16 has its front face constituted by a fibre optic display member 24 in accordance with the invention and as shown in perspective in FIG. 6 of the drawings. The inner surface 25 of this display member is suitably curved so as to meet and make easier the electronic focusing requirements of the oscilloscope 16 and is coated with a suitable fluorescent non-persistent coating. The oscilloscope is arranged to be rotated about the longitudinal axis by means of a geared drive arrangement 26 driven from a motor and gear box 27. By means of this motor and gear box, the oscilloscope 16 can be rotated at constant pre-determined speeds, these speeds being variable by suitable adjustment of the motor and gear box 27. The change in speed can be effected mechanically and/or electrically and can take place in relatively coarse sets of individual steps or substantially continuously within the coarse range. The oscilloscope and picture source circuits 28, are coupled to the oscilloscope 16 by means of a slip ring assembly 30 and are subjected to the usual intensity focus etc. control circuit 31. The motor and gear box assembly 27 on the other hand is provided with a synchronizing output coupling with the oscilloscope and picture source circuit 28 and is subjected to time scale i.e. speed control 32.

The relation between FIGS. 6, 7 and 8 is similar to the relation between FIGS. 2, 3 and 4. Here, FIG. 6 is an approximate perspective view of the display member. FIGS. 7 and 8 are the exact representation of the same display member. FIG. 8 is a view from above of the display member. Since each of the four helical portions of this display member is a continuous surface, a top view would reveal only the abrupt discontinuities where one surface terminates and the next one starts. In order to further clarify the shape of the display member, one of the four equal helical surfaces is represented in detail. This is done by adding the radial lines marked 1, 2, 3, 4, 5 on FIG. 8. Suppose this display member is also sliced like a cake along the radial line marked 1 on FIG. 8, the intersection between the knife and the face of the display member is shown in FIG. 7 and is marked height=1.

The construction of the display member surface and its function in supplying a time base to the 3-dimensional display produced will now be described. Reference will now be made to FIG. 6 of the drawings in which the display member 24 is shown provided with 4 similar helical surfaces 33 which spiral about the common central longitudinal axis of the display member. Each of the surfaces is of such a shape that any point thereon can be defined by coordinates X, Y, Z, wherein $$X = A \cos \theta, \; Y = A \sin \theta, \; Z = Z_0 \frac{\theta}{\pi/2}$$

in the case now being considered where there are four equal surfaces $\theta$ can have values lying between 0 and $\pi/2$ whilst A can have values lying between 0 and the maximum radius of the display member. $Z_0$ on the other hand is a constant which equals the maximum elevation of any point on any of the surfaces.

As can be readily seen from FIGS. 7 and 8 of the drawings and from the equations each radial line, i.e., each line extending from the central axis and normal thereto constitutes an equi-height line of the surface.

In order to understand how the surfaces just described serve as a time base, it will be readily appreciated that upon rotation of the display member about its central axis, each imaginary line extending through one of the helical surfaces parallel to the axis is scanned at a continuous rate by the surface. In other words the depth coordinate Z of the section of such a line with the surface follows a relationship $Z = kt$ where $k$ is constant and $t$ is time. At the end of each cycle of scanning the value of Z should pass from its maximum value to 0 in the shortest possible space of time whereafter the new cycle of scanning commences. By virtue of the fact that the speed of rotation of the surface is constant and the z coordinate of every imaginary line increases completely linearly from its initial value to its maximum value as a function of the angle $\theta$ a constant rate of intersection of the imaginary line with the surface is attained.

In view of the fact that, as indicated above, every radial line of the surface is also an equi-height line, these equi-height lines can be marked at suitable intervals and upon rotation of the surface and illumination of these marked lines they appear as spaced apart planes of light facilitating measurements in the scanned volume.

The examples described have included a radar system which supplies controlled electric pulses to a cathode ray tube. It will be obvious that the cathode ray tube can be supplied by similar pulses which have been recorded on a tape or in any other type of memory system.

The invention can be used to show any three-dimensional picture or family of curves. For such an application the cathode ray tube must be connected to an analogue computer which is adapted to produce the desired information.

Whilst in the example specifically given above four equal surfaces have been provided, the invention is equally applicable in the case where one or more surfaces are provided. It will be appreciated, however, that the provision of more than one surface is particularly effective in achieving good dynamic balancing of the display member upon its rotation.

In all the examples of the display arrangement in accordance with the invention the arrangement in effect processes the information which is available regarding the variation of three parameters and provides resulting information concerning a required function of these parameters. Thus for example, in the case of radar, information is fed into the arrangement concerning the range, azimuthal angle and vertical elevation of an object being tracked, the arrangement then processes this information and provides resulting information concerning the height of the object.

I claim:

1. An apparatus for the exhibition of three-dimensional images comprising, a three-dimensional display member rotatably mounted about a central axis and including a helical surface formed about said axis, a two-dimensional source picture having components which are produced in sequence, optical means for transferring said source picture to said helical surface, and power means for rotating said display member at a speed which is a function of the characteristics of the image.

2. An apparatus for the exhibition of three-dimensional images comprises, a three-dimensional display member rotatably mounted about a central axis and including a helical surface formed about said axis, a bundle of light transmitting fibers disposed in parallel arrangement to said axis for transferring light to said helical surface, and means for creating a two-dimensional source picture of varying light values disposed over a two-dimensional surface, said light values applied to the two-dimensional surface in a time sequence responsive to a third dimensional distance, optical means for transferring said source picture from said two-dimensional surface to the entrance of said bundle and a power means for rotating said display member at a speed which is a function of the speed at which the source picture is created.

3. An apparatus for the exhibition of three-dimensional images comprising, a cathode ray tube fluorescent screen which produces a two-dimensional array of varying light values which are produced in a time sequence responsive to a third dimensional distance, said fluorescent screen has substantially no persistence, a three-dimensional display member rotatably mounted about the cathode ray tube axis and including a helical surface formed about said axis, optical means for transferring said light values from the screen to said helical surface, and a power means for rotating said display member at a speed which is a function of the speed at which the two-dimensional array is produced.

4. An apparatus as claimed in claim 3 wherein said three-dimensional display member includes a bundle of light transmitting fibers secured to each other to form an integral structure, said structure having an entrance face for receiving light from said screen, and a helical surface exit face for showing the three-dimensional image, and wherein an optical projection means focusses the image produced by the said fluorescent screen on the entrance face of the display member.

5. An apparatus as claimed in claim 3 wherein the said fluorescent screen is deposited on the entrance of a face plate made of an integral array of optical fibers, said fibers disposed in axial alignment with the cathode ray tube and said three-dimensional display member is made of another integral array of optical fibers, said display member having an entrance face for receiving light from said fiber optics face plate and a helical surface exit face for showing the three-dimensional image, both the exit face of the said face plate and the entrance face of the display member being shaped similarly, and placed in close proximity so that the display member can rotate freely about its axis and still remain in optical contact with the face plate thus avoiding any need for additional optical means.

6. An apparatus for the exhibition of three-dimensional images comprising, a cathode ray tube having a fluorescent screen having substantially no persistence which is adapted to produce a two-dimensional array of varying light values on a fluorescent screen, said light values being produced in a time sequence responsive to a third dimensional distance, said cathode ray tube having a face plate for supporting the fluorescent screen, said face plate made of an integral array of optical fibers, said fibers disposed in axial alignment with the cathode ray tube and terminating in a helical display surface external to the cathode ray tube space, and a power means for rotating the cathode ray tube and the helical display surface at a speed which is a function of the speed at which the two-dimensional array is produced.

7. An apparatus for the exhibition of three-dimensional images comprising a cathode ray tube having a face plate in the form of a helical surface about the tube axis, a fluorescent screen on said face plate, said cathode ray tube adapted to produce a two-dimensional array of varying light values on said screen, said light values being produced in a time sequence responsive to a third dimensional distance, and a power means for rotating said cathode ray tube at a speed which is a function of the speed at which the two-dimensional array is produced.

8. An apparatus for the exhibition of three-dimensional images comprising, a two-dimensional source picture having components which are produced in a time sequence responsive to a third-dimensional distance, a three-dimensional display member rotatably mounted adjacent to said source picture for producing a virtual three-dimensional image, said display member including a helical reflecting surface formed about an axis of rotation, and a power means for rotating said display member at a speed which is a function of the speed at which the source picture is created.

9. An apparatus for the exhibition of three-dimensional images comprising, a two-dimensional source picture having components which are produced in a time sequence responsive to a third-dimensional distance, a three-dimensional display member rotatably mounted adjacent to said source picture for producing a virtual three-dimensional image, said display member including a helical opaque surface formed about an axis of rotation, optical projection means for focusing said source picture onto said opaque surface, and a power means for rotating said display member at a speed which is a function of the speed at which the two-dimensional array is produced.

10. An apparatus for the exhibition of three-dimensional images comprising, a two-dimensional source picture having components which are produced in a time sequence responsive to a third-dimensional distance, a three-dimensional display member rotatably mounted adjacent to said source picture for producing a virtual three-dimensional image, said display member including a helical semi-opaque surface formed about an axis of rotation, optical projection means for focusing said source picture onto said semi-opaque surface and a power means for rotating said display member at a speed which is a function of the speed at which the two-dimensional array is produced.

11. An apparatus for the exhibition of three-dimensional images comprising, a cathode ray tube fluorescent screen which has substantially no persistence adapted to produce a two-dimensional array of varying light values responsive to the intensity of a cathode ray beam, electrical and mechanical means for controlling the intensity and position of said beam, said means including a radar system comprising a transmitter for generating radio frequency energy, an antenna scanning means for covering a desired three-dimensional space with said radio frequency energy beam, a receiver for receiving reflected energy from objects in said three-dimensional space, said receiver controlling the intensity of said beam, and means for positioning and deflecting said cathode ray beam in synchronism with the scanning of said antenna, a three-dimensional display member rotatably mounted about the cathode ray tube axis and including a helical surface formed about said axis, optical means for transferring said light values from the screen to said helical surface, and a power means for rotating said display member at a speed which is a function of the speed at which said antenna scans said three-dimensional space.

12. An apparatus as claimed in claim 11 wherein said antenna scanning means include a first antenna control means which moves said radio frequency beam in the horizontal plane at a first speed of rotation and a second antenna control means which moves said radio frequency beam periodically in the vertical plane at a second speed, said second speed comprises two components: speed of scanning and speed of returning from end position of particular vertical scanning to the beginning position of the next vertical scanning, said speed of the three dimensional display member is the sum of the said horizontal speed and the scanning component of the vertical speed.

13. An apparatus as claimed in claim 12 wherein the helical surface on the display device is defined by the following equation:

$$Z(r_1\phi) = Kr\phi + f(r)$$

where $Z_1r$ and $\phi$ are the cylindrical coordinates of any point on the helical surface, $0 \leq \phi \leq 2\pi$ is the angular displacement of any point on the surface from the reference radius, $r$ is the radial distance of any point from the axis of said helical surface and Z is the vertical displacement of any point from a reference level, K is a scale factor, $f(r)$ is a correction value to be added to $Kr\phi$ in order to take into account the departure from the trigonometric relation $Z = R \cos \theta$ when $\theta$ is the elevation angle of the antenna, R is the slant range of the detected object and Z is the calculated real height of the detected object, and wherein a plurality of equal helical surfaces constitute the three-dimensional viewing member, so that the limits of $\phi$ will be:

$$0 \leq \phi \leq \frac{2\pi}{n}$$

where $n$ is the number of equal helical surfaces and the scaling factor R will be changed accordingly.

References Cited by the Examiner

UNITED STATES PATENTS

| | | | |
|---|---|---|---|
| 2,967,248 | 1/1961 | Nicoll | 88—1 |
| 3,043,910 | 7/1962 | Hicks | 88—1 X |
| 3,079,585 | 2/1963 | Perry et al. | 343—7.9 X |
| 3,097,261 | 7/1963 | Schipper et al. | 343—7.9 X |
| 3,140,415 | 7/1964 | Ketchpel | 343—7.9 X |
| 3,202,985 | 8/1965 | Perkins et al. | 343—7.9 |
| 3,204,238 | 8/1965 | Skellett | 343—7.9 |

CHESTER L. JUSTUS, *Primary Examiner.*

P. M. HINDERSTEIN, E. T. CHUNG, R. D. BENNETT, *Assistant Examiners.*